United States Patent
Kutz et al.

(10) Patent No.: US 11,909,474 B2
(45) Date of Patent: Feb. 20, 2024

(54) RANK ADAPATION FOR MIMO TRANSMISSIONS AND RETRANSMISSIONS

(71) Applicant: QUALCOMM Incorporated, San Diego, CA (US)

(72) Inventors: Gideon Shlomo Kutz, Ramat Hasharon (IL); Tal Oved, Modiin (IL); Amit Bar-Or Tillinger, Tel-Aviv (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/319,836

(22) Filed: May 13, 2021

(65) Prior Publication Data
US 2022/0368387 A1    Nov. 17, 2022

(51) Int. Cl.
| | |
|---|---|
| H04B 7/0456 | (2017.01) |
| H04B 17/336 | (2015.01) |
| H04L 1/06 | (2006.01) |
| H04L 5/00 | (2006.01) |
| H04L 1/1812 | (2023.01) |

(52) U.S. Cl.
CPC ......... H04B 7/0486 (2013.01); H04B 17/336 (2015.01); H04L 1/0618 (2013.01); H04L 1/1819 (2013.01); H04L 5/0051 (2013.01)

(58) Field of Classification Search
CPC ... H04B 7/0486; H04B 17/336; H04L 1/0618; H04L 5/0051
See application file for complete search history.

(56) References Cited

U.S. PATENT DOCUMENTS

| | | | | |
|---|---|---|---|---|
| 2003/0189999 | A1* | 10/2003 | Kadous | H04L 1/0618 |
| | | | | 375/267 |
| 2007/0115864 | A1* | 5/2007 | Bar-Ness | H04L 1/1867 |
| | | | | 370/278 |
| 2009/0017769 | A1* | 1/2009 | Chen | H04B 7/0632 |
| | | | | 455/69 |
| 2009/0129497 | A1* | 5/2009 | Stopler | H04L 25/0204 |
| | | | | 375/267 |

(Continued)

FOREIGN PATENT DOCUMENTS

| | | | |
|---|---|---|---|
| WO | 2008096308 A1 | 8/2008 | |
| WO | WO-2016106648 A1 * | 7/2016 | ........... H04L 1/0046 |

OTHER PUBLICATIONS

Jonna et al. ("Rank and MIMO Mode Adaptation in LTE"; IEEE ANTS 2013) (Year: 2013).*

(Continued)

*Primary Examiner* — Redentor Pasia
(74) *Attorney, Agent, or Firm* — Patterson + Sheridan, LLP

(57) ABSTRACT

Certain aspects of the present disclosure provide a technique for wireless communications by a user equipment (UE). The UE implements the technique to detect that a decoding failure of a first multiple input multiple output (MIMO) transmission, sent by a network entity on a first number of layers, is caused by a rank mismatch. The UE then sends a rank correction request to a network entity. The UE then combines samples from the first MIMO transmission and a second MIMO transmission, sent by the network entity using a space-time code (STC) with a second number of layers in response to the rank correction request, to recover data lost due to the decoding failure.

30 Claims, 11 Drawing Sheets

(56) References Cited

U.S. PATENT DOCUMENTS

| | | | | |
|---|---|---|---|---|
| 2009/0241002 | A1* | 9/2009 | Ko | H04L 1/0625 |
| | | | | 714/748 |
| 2009/0316840 | A1* | 12/2009 | Park | H04L 1/0631 |
| | | | | 375/340 |
| 2010/0315969 | A1* | 12/2010 | Jongren | H04B 7/063 |
| | | | | 370/252 |
| 2013/0083863 | A1* | 4/2013 | Gupta | H04B 15/00 |
| | | | | 375/267 |
| 2013/0121269 | A1* | 5/2013 | Nammi | H04L 25/03343 |
| | | | | 370/329 |
| 2014/0036657 | A1* | 2/2014 | Suter | H04L 1/0076 |
| | | | | 370/216 |
| 2014/0112406 | A1* | 4/2014 | Zhu | H04B 7/0417 |
| | | | | 375/267 |
| 2014/0245095 | A1* | 8/2014 | Nammi | H04L 5/0055 |
| | | | | 714/749 |
| 2015/0236773 | A1* | 8/2015 | Kim | H04B 7/0639 |
| | | | | 375/295 |
| 2016/0227559 | A1* | 8/2016 | Schober | H04W 72/542 |
| 2016/0373224 | A1* | 12/2016 | Kim | H04L 5/0023 |
| 2017/0079058 | A1* | 3/2017 | Liu | H04B 7/0413 |
| 2017/0288751 | A1* | 10/2017 | Faxér | H04B 7/0617 |
| 2017/0324519 | A1* | 11/2017 | Guo | H04L 1/1845 |
| 2018/0337764 | A1* | 11/2018 | Kwok | H04W 72/21 |
| 2020/0100178 | A1* | 3/2020 | Kim | H04B 7/046 |
| 2020/0112352 | A1* | 4/2020 | Hu | H04B 7/0417 |
| 2020/0162133 | A1* | 5/2020 | Harrison | H04B 7/0617 |
| 2020/0186207 | A1* | 6/2020 | Davydov | H04B 7/0426 |
| 2020/0344009 | A1* | 10/2020 | Shao | H04L 5/0092 |
| 2020/0366317 | A1* | 11/2020 | Myung | H03M 13/1125 |
| 2021/0067230 | A1* | 3/2021 | Asplund | H04B 7/0639 |
| 2021/0143870 | A1* | 5/2021 | Faxér | H04B 7/0626 |
| 2021/0259009 | A1* | 8/2021 | Chen | H04W 52/146 |
| 2021/0273695 | A1* | 9/2021 | He | H04B 7/0486 |
| 2021/0376898 | A1* | 12/2021 | Levitsky | H04B 7/0626 |
| 2022/0109474 | A1* | 4/2022 | Haghighat | H04B 7/063 |
| 2022/0210855 | A1* | 6/2022 | Chang | H04W 76/19 |

OTHER PUBLICATIONS

International Search Report and Written Opinion—PCT/US2022/072160—ISA/EPO—dated Aug. 5, 2022.

Van Nguyen A., et al., "Hybrid ARQ Protocols Using Space-Time Codes", IEEE 54th Vehicular Technology Conference, VTC Fall 2001, Proceedings Oct. 7-11, 2001 Atlantic City, NJ, USA, IEEE Vehicular Technology Conference, Proceedings (Cat.No. 01CH37211), vol. 4, Oct. 7, 2001, XP010562394, pp. 2364-2368.

* cited by examiner

| Rank Adaptation Sequence | 1st re-Tx | 2nd re-Tx |
|---|---|---|
| 4→3 | $\begin{bmatrix} H_A[p_{A0}\,p_{A1}\,p_{A2}\,p_{A3}\,0\,0] \\ H_B[0\,0\,p_{B3}\,p_{B2}\,p_{B1}\,p_{B0}] \end{bmatrix}$ | |
| 4→3→2 | $\begin{bmatrix} H_A[p_{A0}\,p_{A1}\,p_{A2}\,p_{A3}\,0\,0] \\ H_B[0\,0\,0\,p_{B2}\,p_{B1}\,p_{B0}] \end{bmatrix}$ | $\begin{bmatrix} H_A[p_{A0}\,p_{A1}\,p_{A2}\,p_{A3}\,0\,0] \\ H_B[0\,0\,0\,p_{B2}\,p_{B1}\,p_{B0}] \\ H_C[0\,0\,p_{C1}\,p_{C0}\,0\,0] \end{bmatrix}$ |
| 4→2 | $\begin{bmatrix} H_A[p_{A0}\,p_{A1}\,p_{A2}\,p_{A3}] \\ H_B[0\,0\,p_{B1}\,p_{B0}] \end{bmatrix}$ | |
| 2→1 | $\begin{bmatrix} H_A[p_{A0}\,p_{A1}] \\ H_B[0\,p_{B0}] \end{bmatrix}$ | |

FIG. 7

RANK ADAPATION FOR MIMO TRANSMISSIONS AND RETRANSMISSIONS

INTRODUCTION

Aspects of the present disclosure relate to wireless communications, and more particularly, to techniques for managing multiple input multiple output (MIMO) transmissions and retransmissions.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), including: detecting that a decoding failure of a first multiple input multiple output (MIMO) transmission, sent by a network entity on a first number of layers, is caused by a rank mismatch; sending, to the network entity, a rank correction request; and combining samples from the first MIMO transmission and a second MIMO transmission, sent by the network entity using a space-time code (STC) with a second number of layers in response to the rank correction request, to recover data lost due to the decoding failure.

Another aspect provides a method for wireless communications by a network entity, including: sending, to a UE, a first MIMO transmission on a first number of layers; receiving, from the UE, a rank correction request on detection of a decoding failure of the first MIMO transmission caused by a rank mismatch; and sending a second MIMO transmission with a second number of layers, using a STC, in response to the rank correction request, to the UE that combines samples from the first MIMO transmission and the second MIMO transmission to recover data lost due to the decoding failure.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7 depicts example first and second MIMO retransmissions for different rank adaptation sequences.

DETAILED DESCRIPTION

Aspects of the present disclosure provide apparatuses, methods, processing systems, and computer-readable mediums for managing multiple input multiple output (MIMO) transmissions and retransmissions. For example, when a user equipment (UE) sends to a base station (BS) a MIMO transmission with more layers than a current channel rank, the BS will not be able to successfully decode the MIMO transmission and then one or more MIMO retransmissions have to be sent to the BS. In such cases, the MIMO retransmissions may be managed based on a rank adaptation for a multiple incremental redundancy scheme (MIRS). MIRS generally refers to a rate adaptation scheme based on incremental redundancy hybrid automatic repeat request (IR-HARQ) retransmissions that may have substantial gains over channel state information reference signal (CSI-RS) based rate adaptation.

In certain aspects, for rate adaptation, retransmissions may be considered thin (e.g., have a smaller size than initial transmissions) and there may be little or no additional cost (from a capacity perspective) in multiple retransmissions, so a first transport block (TB) transmission can be started from an overestimated modulation and coding scheme (MCS). The present disclosure describes a technique to recover from a decoding failure of the first TB transmission resulting from an overestimation of a MIMO matrix rank. The technique decreases a cost of a rank indication (RI) overestimation, and thereby allowing for more aggressive rank selection strategies. Unlike the rate adaptation, overestimation of the RI carry a penalty that cannot be completely eliminated but decreased significantly. As a result, every time there is the overestimation of the RI, the technique described herein recovers most of a throughput loss.

Introduction to Wireless Communication Networks

Figure 1:
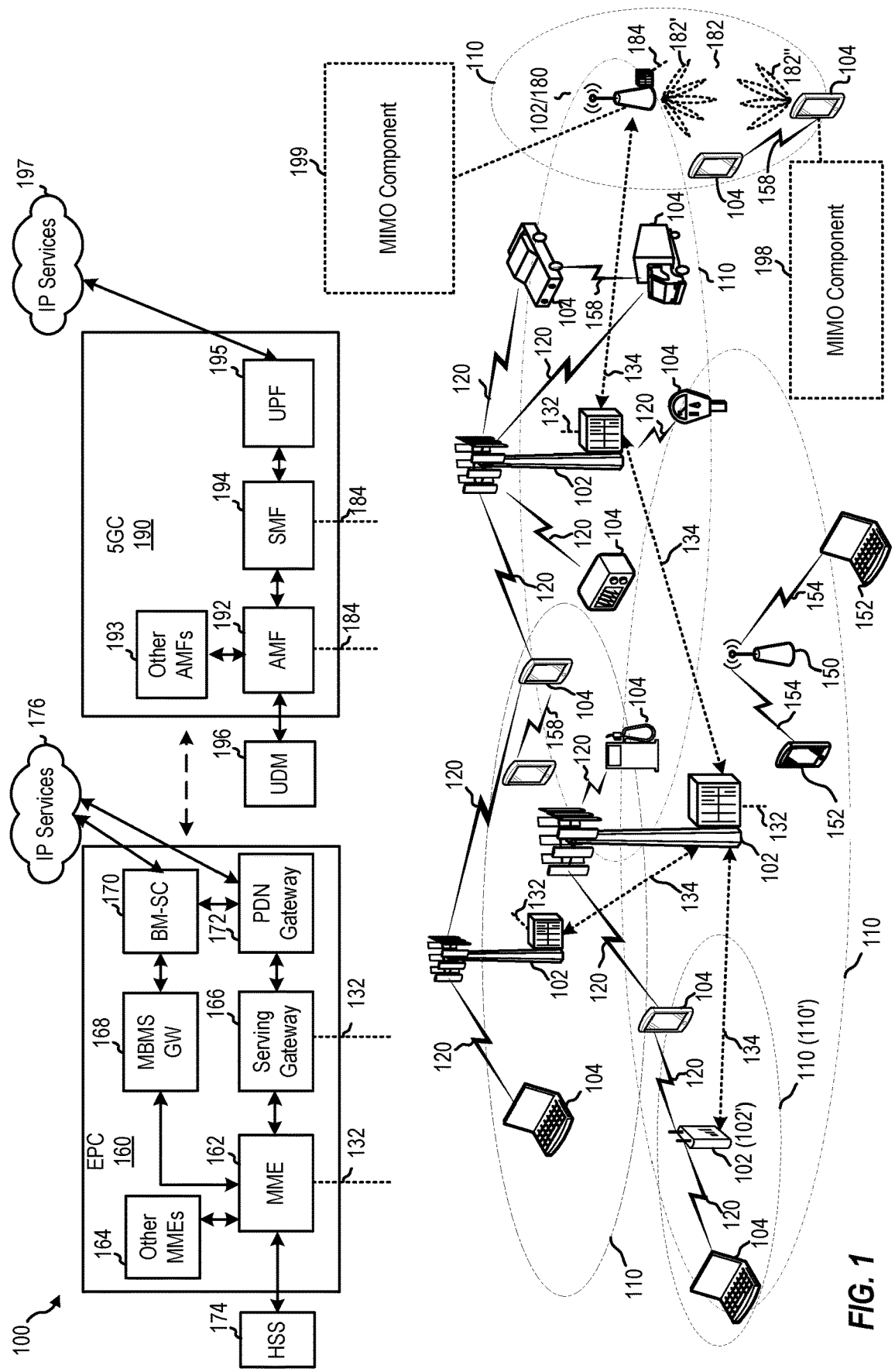
FIG. 1 is a block diagram conceptually illustrating an example wireless communication network.

FIG. 1 depicts an example of a wireless communications system 100, in which aspects described herein may be implemented.

Figure 4:
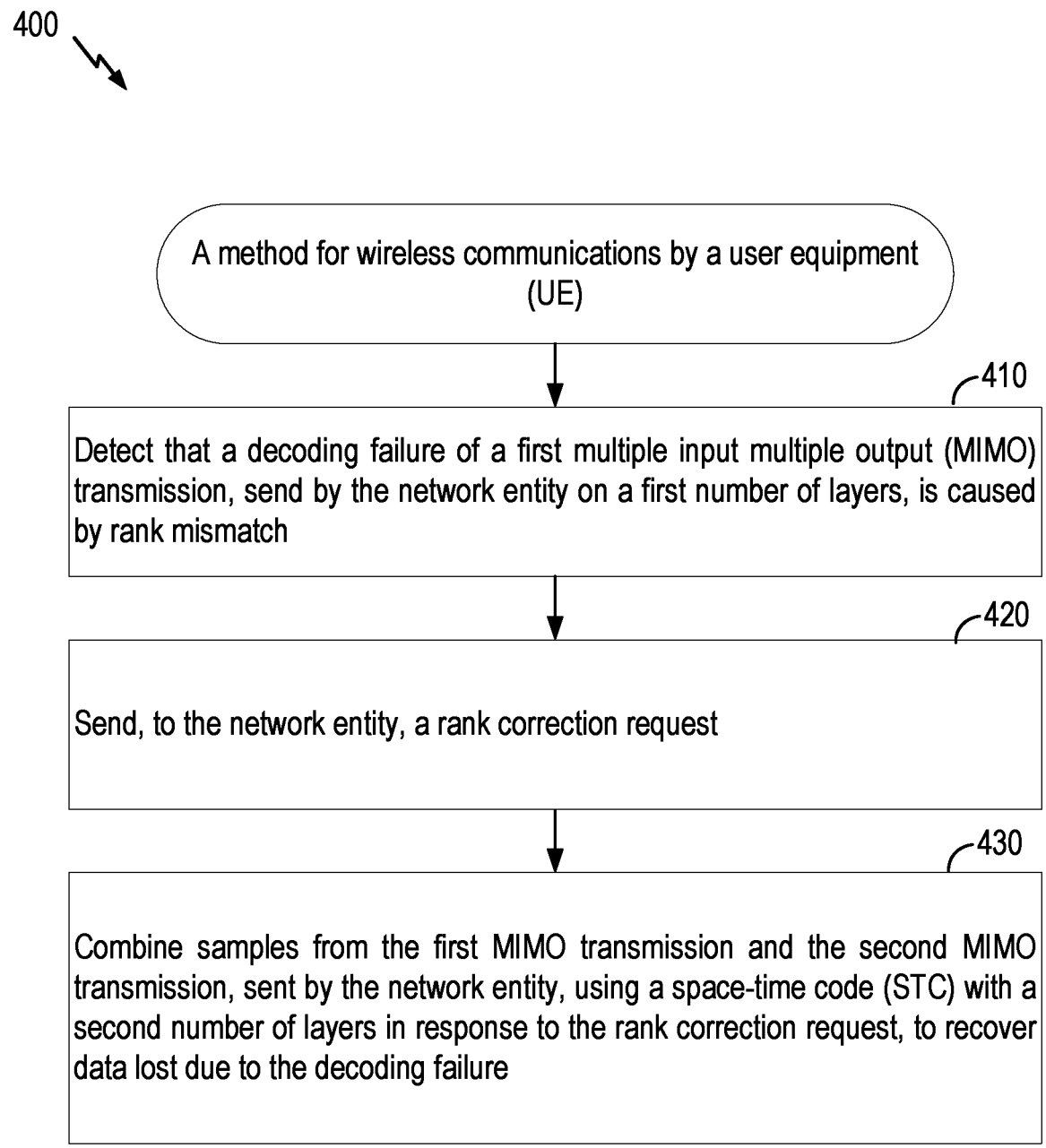
FIG. 4 depicts a flow diagram illustrating example operations for wireless communication by a UE.
Figure 5:
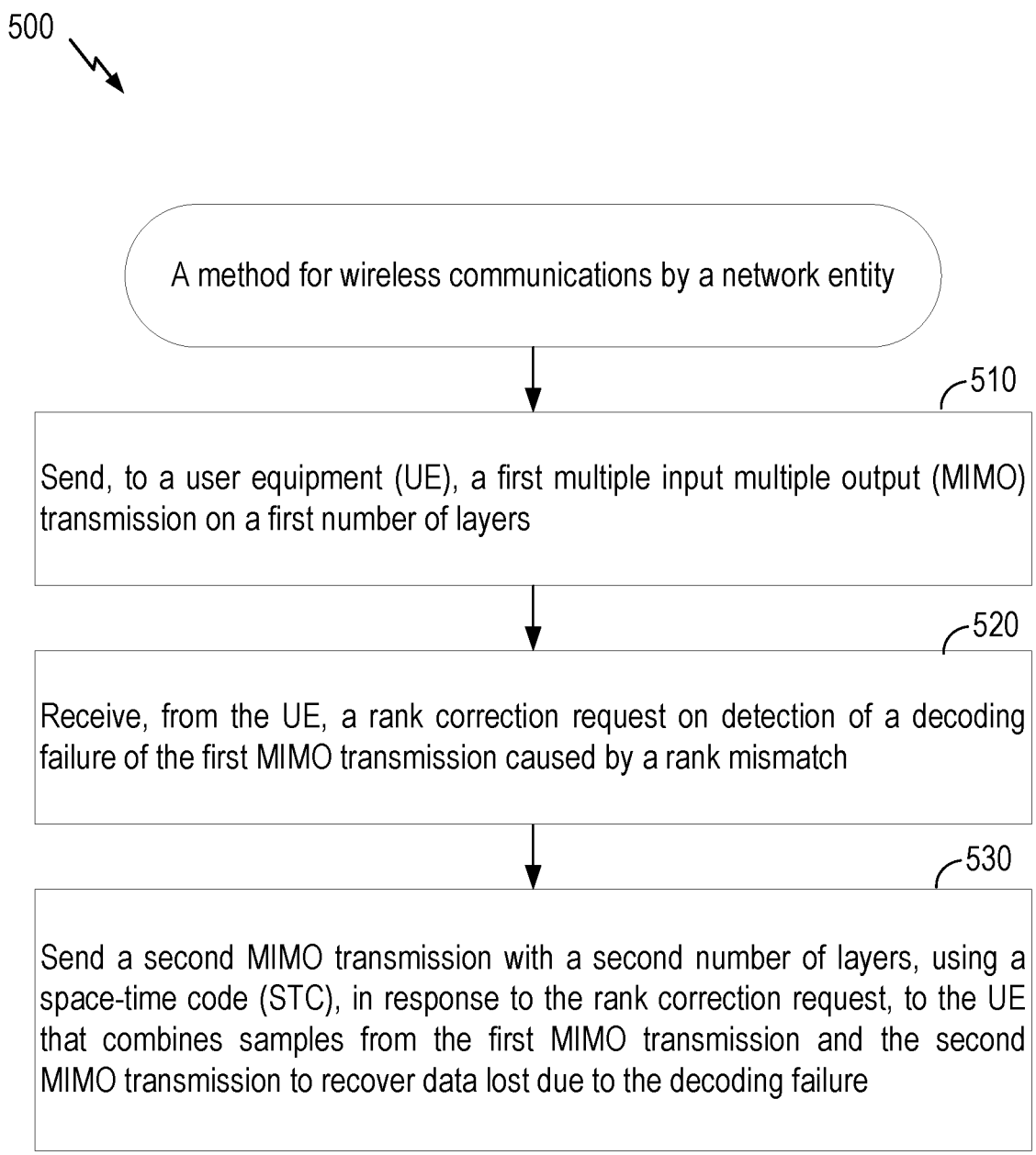
FIG. 5 depicts a flow diagram illustrating example operations for wireless communication by a network entity.

For example, wireless communication network 100 may include MIMO component 199, which may be configured to perform, or cause a base station (BS) 102 to perform, operations 500 of FIG. 5. Wireless communication network 100 may also include MIMO component 198, which may be configured to perform, or cause a user equipment (UE) 104 to perform, operations 400 of FIG. 4.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
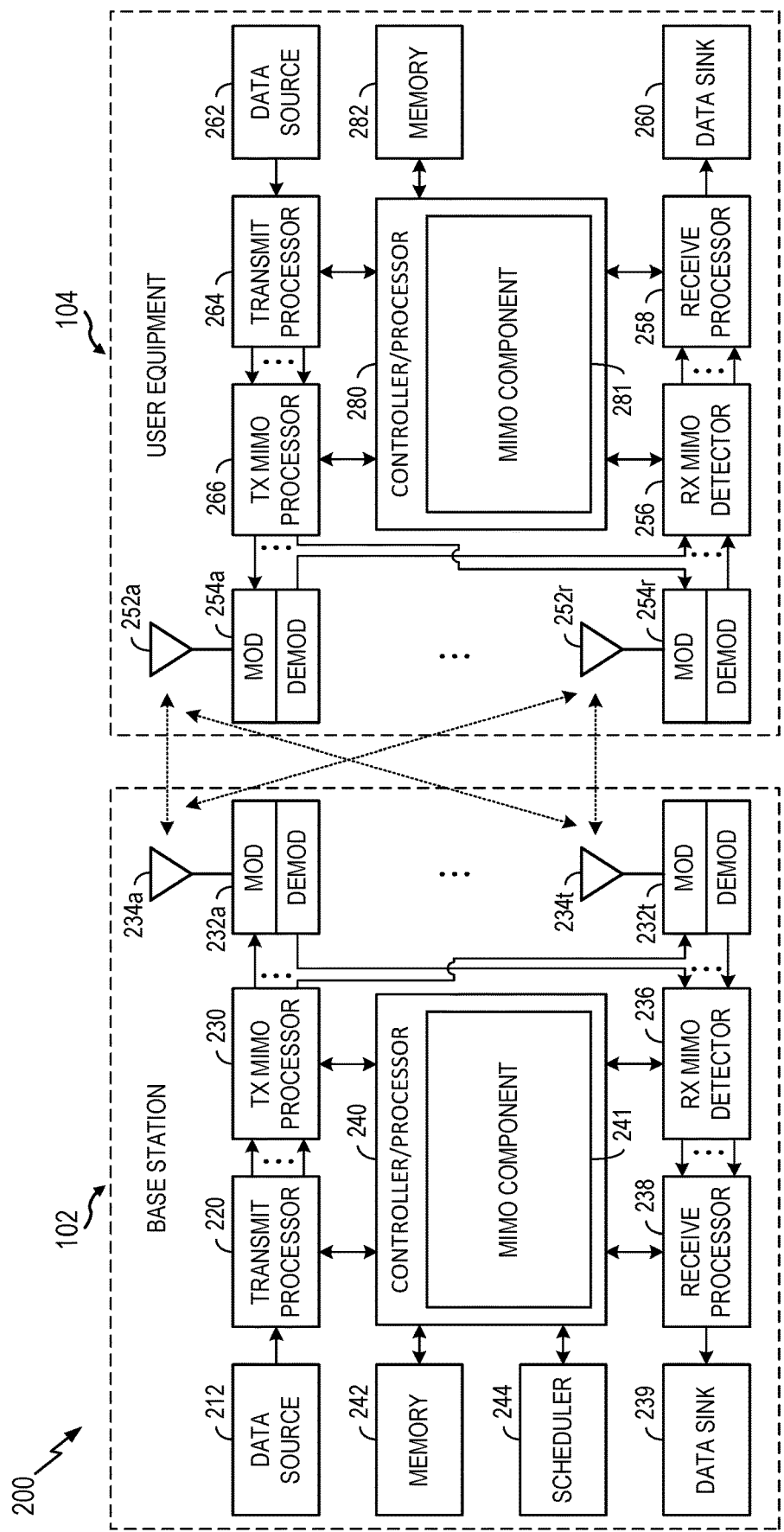
FIG. 2 is a block diagram conceptually illustrating aspects of an example a base station (BS) and user equipment (UE).

FIG. 2 depicts aspects of an example BS 102 and a UE 104 (e.g., in wireless communication network 100 of FIG. 1).

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes MIMO component 241, which may be representative of MIMO component 199 of FIG. 1. Notably, while depicted as an aspect of controller/processor 240, MIMO component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes MIMO component 281, which may be representative of MIMO component 198 of FIG. 1. Notably, while depicted as an aspect of controller/processor 280, MIMO component 281 may be implemented additionally or alternatively in various other aspects of UE 104 in other implementations.

Figure 3:
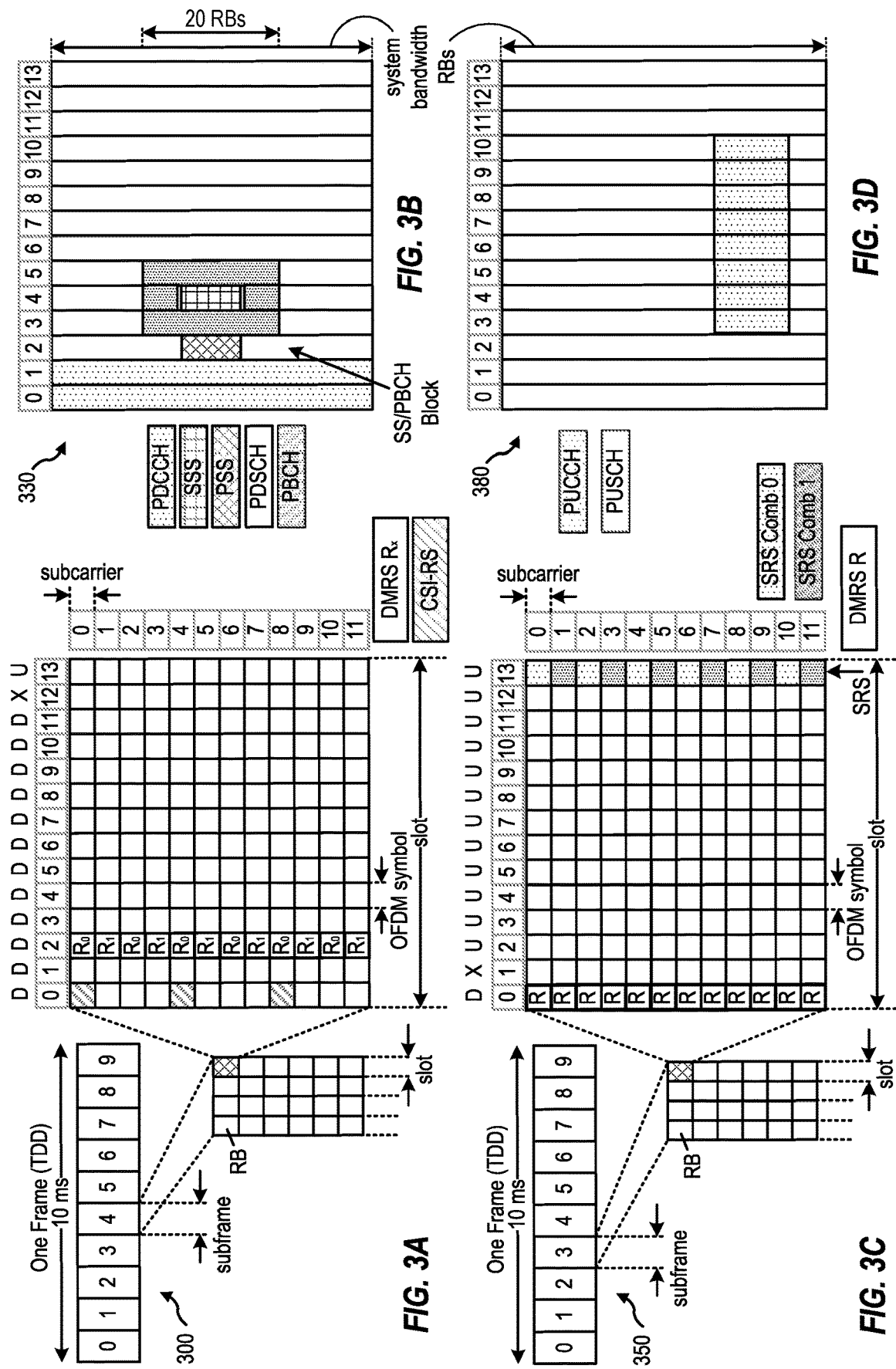
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Optimal Modulation and Coding Scheme (MCS) Selection Scheme

A new rate adaptation scheme for a new radio (NR) is provided for closing a gap between an optimal link adaptation and a current channel state information reference signal (CSI-RS) based link adaptation.

In some cases, a current CSI-RS based channel capacity tracking scheme cannot adapt to an instantaneous optimal modulation and coding scheme (MCS) (e.g., a highest MCS that can be decoded successfully on a specific transmission time interval (TTI)). Accordingly, the current CSI-RS based channel capacity tracking scheme does not utilize a full available channel capacity.

There are multiple reasons for the current CSI-RS based channel capacity tracking scheme not being able to adapt to the instantaneous MCS and utilize the full available channel capacity. For example, a CSI-RS estimation is not perfect and often does not accurately model a performance of a receiver device (e.g., a user equipment (UE)). Also, a channel state is sampled only at a discrete time (i.e., CSI-RS slots) while even in low velocities the optimal MCS (and coding rate) significantly changes between the CSI-RS slots. In some cases, even for the low velocities, following the optimal MCS between the CSI-RS slots (e.g., 40 CSI-RS slots) is not possible in the current CSI-RS based channel capacity tracking scheme as a MCS value has to be changed multiple times within this interval.

In the current CSI-RS based channel capacity tracking scheme, a MCS (e.g., the coding rate) is set on a first transmission and cannot be dynamically adapted. If the first transmission fails, approximately a same number of coded bits are retransmitted. A current retransmission scheme uses a small set of redundancy versions (RVs) to select the coded bits for retransmission. When the selected coded bits are the same coded bits as the first transmission (chase combining), it results in a same code rate. When the selected coded bits are new coded bits (incremental redundancy), it results in reducing (halving) the effective coding rate in a second retransmission.

Accordingly, the coding rate should be carefully selected on the first transmission. This is because an overestimated coding rate may result in multiple decoding errors and leads to a throughput loss, and an underestimated coding rate may result in a loss of a throughput as a larger payload could have been transmitted over a same channel resource.

In some cases, a link adaptation between CSI-RS slots is performed using an outer loop link adaptation (OLLA) process but it cannot track the optimal MCS changes accurately.

In some cases, when there is an optimal CSI estimation and a MCS is optimally selected on CSI-RS slots (regardless of using OLLA or not), a throughput performance is far from an achievable performance of optimal per slot MCS selection.

Overview of Multiple Incremental Redundancy Scheme (MIRS)

A multi incremental redundancy scheme (MIRS) can approach performance of an optimal modulation and coding scheme (MCS) selection and achieve communication at a capacity code rate regardless of a mobility. MIRS is implemented based on several factors. For example, the scheme may initially start with an overestimated MCS to ensure a throughput is not lost due to an underestimated coding rate. The scheme may also rely on an extensive usage of a small sized retransmission (incremental redundancy hybrid automatic repeat request (IR-HARQ)) for fine dynamic adaptation of a coding rate, based on an acknowledgement (ACK)/negative acknowledgement (NACK) feedback from a receiver device. Accordingly, each time the receiver device sends the NACK (or does not send the ACK), a small number of additional redundancy bits are transmitted. In some cases, per feed code block (CB) feedback is used to maximize the channel utilization.

In some MIRS schemes, on a first transmission, a transmitter device (e.g., gNodeB) selects an over optimistic MCS (that may be expected to fail in most cases). The selection of the MCS determines coding parameters (e.g., a coding rate, a transport block size (TBS), etc.) for all subsequent retransmissions. In some cases, for each decoding failure of a received transmission, a receiver device sends a feedback with per CB decoding results. In some cases, the receiver devices sends additional information to allow the transmitter device a faster convergence to an actual acceptable coding rate. In some cases, for each decoding failure of the received transmission, the transmitter device schedules and sends additional bits for each failing transport block (TB) (for each failing CB) from initial coded bits buffer of the CBs. In some cases, added bits in each retransmission to the receiver device are used to reduce an effective rate of each CB in fine steps until all CBs (and consequently the complete TB) are decoded successfully. In some cases, a total number of bits sent over first and subsequent transmissions determines an actual used coding rate for each TB.

Overview of Multiple Input Multiple Output (MIMO) Capacity

In a multiple input multiple output (MIMO) based wireless communication system, a transmitter device (e.g., a base station (BS)) sends a transmission to a receiver device (e.g., a user device (UE)). In some cases, the transmission (y) is $\tilde{H}x+n$ where $\tilde{H}=HP$. In this transmission, P corresponds to a precoding matrix, H corresponds to a channel matrix, and n corresponds to noise.

A MIMO capacity (c) is $$\log_2 \det\left(I + \frac{1}{\sigma^2}HQH^H\right)$$

where Q corresponds to transmit data autocorrelation.

The MIMO capacity is maximized when $Q=VSV^H$. Here, V corresponds to eigenvectors matrix received from singular value decomposition (SVD) of $H=UDV^H$ and S corresponds to a diagonal matrix of power per layer.

The MIMO capacity with an optimal precoding is $$\log_2 \det\left(I + \frac{1}{\sigma^2}U|D|^2SU^H\right) = \sum \log_2\left(1 + \frac{1}{\sigma^2}|D_i|^2 S_i\right).$$

Here, S corresponds to a power loading per layer and is maximized with a water pouring solution.

In some cases, power loading is not done in a new radio (NR) except for binary loading by selecting a rank indication (RI):

$$S_i = \begin{cases} \frac{1}{L} & \text{layer is transmitted} \\ 0 & \text{layer not transmitted} \end{cases}.$$

In such cases, an optimal number of layers (L) is equal to:

$$\operatorname*{argmax}_{L} \sum_{l=0}^{L-1} \log_2\left(1 + \frac{1}{\sigma^2} \frac{|D_l|^2}{L}\right)$$

In some cases, bit loading is performed by selecting different MCS per layer (only partially possible in a current NR specification such as up to two transport blocks (TBs) for more than 4 MIMO layers). Alternatively, in some cases, a single codeword is multiplexed on all layers and an average MCS is used over all layers.

Aspects Related to Compensating for Overestimation of Rank Indication (RI) through Space Time Precoding Aspects of the present disclosure provide apparatuses, methods, processing systems, and computer-readable mediums for managing multiple input multiple output (MIMO) transmissions and retransmissions, based on a rank adaptation for a multiple incremental redundancy scheme (MIRS).

For example, techniques presented herein may help recover from a decoding failure of a MIMO transmission due to an overestimation of a MIMO matrix rank. The techniques may decrease a cost of a rank indication (RI) overestimation, and thereby allowing for more aggressive rank selection strategies. The overestimation of RI carries a penalty that cannot be completely eliminated but decreased significantly. As a result, every time there is the overestimation of the RI, the techniques described herein may help recover most of the throughput loss.

FIG. 4 depicts a flow diagram illustrating example operations 400 for wireless communication. The operations 400 may be performed, for example, by a UE (e.g., such as the UE 104 in the wireless communication network 100 of FIG. 1). The operations 400 may be implemented as software components that are executed and run on one or more processors (e.g., the controller/processor 280 of FIG. 2). Further, transmission and reception of signals by the UE in operations 1300 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 400 begin, at 410, by detecting that a decoding failure of a first MIMO transmission, sent by a network entity on a first number of layers, is caused by a rank mismatch. For example, the UE may detect the decoding failure using a processor of the UE 104 shown in FIG. 1 or FIG. 2 and/or of the apparatus shown in FIG. 10.

At 420, the UE sends to the network entity a rank correction request. For example, the UE may send the rank correction request to the network entity using antenna(s) and transmitter/transceiver components of the UE 104 shown in FIG. 1 or FIG. 2 and/or of the apparatus shown in FIG. 10.

At 430, the UE combines samples from the first MIMO transmission and a second MIMO transmission, sent by the network entity using a space-time code (STC) with a second number of layers in response to the rank correction request, to recover data lost due to the decoding failure. The UE may combine the samples from the first MIMO transmission and a second MIMO transmission using a processor of the UE 104 shown in FIG. 1 or FIG. 2 and/or of the apparatus shown in FIG. 10.

FIG. 5 is a flow diagram illustrating example operations 500 for wireless communication. The operations 500 may be performed, for example, by a network entity (e.g., such as the BS 102 in the wireless communication network 100 of FIG. 1). The operations 500 may be implemented as software components that are executed and run on one or more processors (e.g., the controller/processor 240 of FIG. 2). Further, transmission and reception of signals by the network entity in operations 1400 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 500 begin, at block 510, by sending to a UE a first MIMO transmission on a first number of layers. For example, the network entity may send the first MIMO transmission to the UE using antenna(s) and transmitter/transceiver components of the BS 102 shown in FIG. 1 or FIG. 2 and/or of the apparatus shown in FIG. 11.

At 520, the network entity receives from the UE a rank correction request on detection of a decoding failure of the first MIMO transmission caused by a rank mismatch. For example, the network entity may receive the rank correction request from the UE using antenna(s) and receiver/transceiver components of the BS 102 shown in FIG. 1 or FIG. 2 and/or of the apparatus shown in FIG. 11.

At 530, the network entity sends a second MIMO transmission with a second number of layers, using a STC, in response to the rank correction request, to the UE that combines samples from the first MIMO transmission and the second MIMO transmission to recover data lost due to the decoding failure. For example, the network entity may send the second MIMO transmission to the UE using antenna(s) and processor(s) of the BS 102 shown in FIG. 1 or FIG. 2 and/or of the apparatus shown in FIG. 11.

Figure 6:
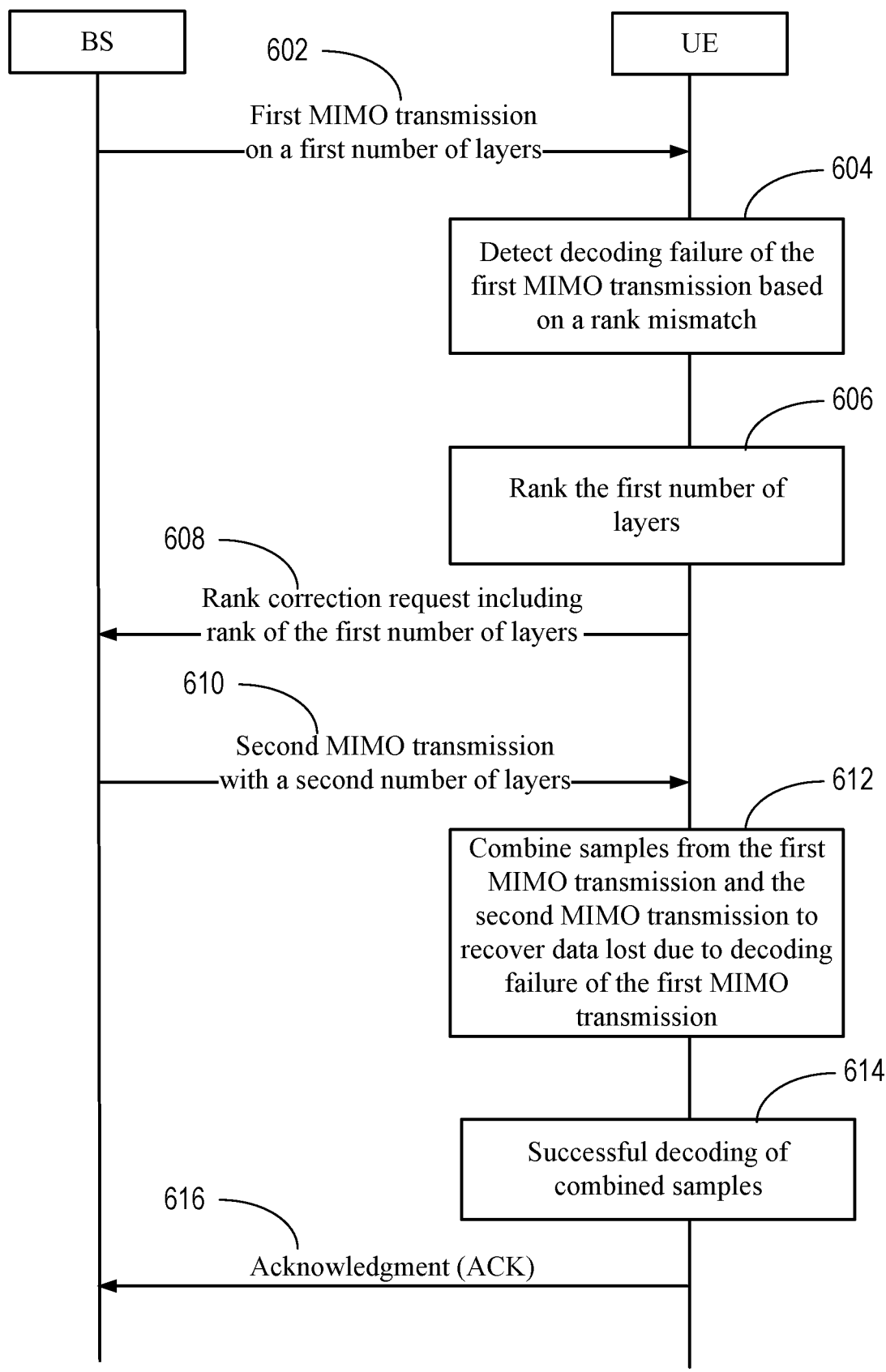
FIG. 6 depicts a call flow diagram illustrating example signaling for multiple input multiple output (MIMO) transmission and retransmissions.

The operations shown in FIGS. 4 and 5 may be understood with reference to the call flow diagram of FIG. 6.

As illustrated in FIG. 6, at 602, a BS (e.g., the BS 102 shown in FIG. 1 or FIG. 2) sends a first MIMO transmission on a first number of layers to a UE (e.g., the UE 104 shown in FIG. 1 or FIG. 2). In certain aspects, the first MIMO transmission has a precoding matrix associated with the first number of layers.

At 604, the UE decodes the first MIMO transmission and detects a decoding failure of the first MIMO transmission based on a rank mismatch. The rank mismatch indicates a mismatch between a previously indicated rank and a rank supported by channel conditions experienced by the first MIMO transmission. In one example, the rank mismatch occurs when the UE attempts to send more number of layers in the first MIMO transmission than a current channel rank.

At 606, the UE ranks the first number of layers. In one example, the UE ranks the first number of layers based on a signal to noise ratio (SNR).

At 608, the UE sends a rank correction request and information regarding the ranking of the first number of layers. In certain aspects, the rank correction request is sent via a physical uplink control channel (PUCCH). In certain aspects, the rank correction request is sent via a physical uplink shared channel (PUSCH).

In certain aspects, the rank correction request indicates a requested rank. In some cases, the UE receives a demodulation reference signal (DMRS) from the BS, and then determines the requested rank based on the DMRS.

In certain aspects, the rank correction request indicates a difference in rank. The difference in rank indicates a value corresponding to a difference between the previously indicated rank and the rank supported by the channel conditions experienced by the first MIMO transmission.

In certain aspects, the UE participates in a coding rate adaptation after sending the rank correction request.

At 610, the BS sends a second MIMO transmission with a second number of layers, in response to the rank correction request. The BS applies a STC in the second MIMO transmission. The second MIMO transmission conveys data equivalent of the second number of layers. The second MIMO transmission may have a modified precoding matrix for the second number of layers.

In certain aspects, the second number of layers may include a number of new layers. In certain aspects, the second number of layers may include the first number of layers. In certain aspects, the second number of layers may include a subset of the first number of layers. Layers within the subset of the first number of layers may be selected based on their associated SNR (or eigenvalue). In one example, the selected layers may have the lowest SNRs. In certain aspects, the second number of layers may include a combination of the number of new layers, the first number of layers, and/or the subset of the first number of layers.

At 612, the UE combines samples from the first MIMO transmission and the second MIMO transmission to recover data lost due to the decoding failure of the first MIMO transmission.

In certain aspects, same precoding vectors are used for the first MIMO transmission and the second MIMO transmission when channel conditions are same or similar between the first MIMO transmission and the second MIMO transmission. In certain aspects, although the same precoding vectors are used for the first MIMO transmission and the second MIMO transmission, but an order of the precoding vectors is changed in the second MIMO transmission.

At 614, the UE performs decoding of the combined samples of the first MIMO transmission and the second MIMO transmission. The UE successfully decodes the combined samples of the first MIMO transmission and the second MIMO transmission.

At 616, the UE sends an acknowledgment (ACK) to the BS, in response to the successful decoding of the combined samples of the first MIMO transmission and the second MIMO transmission.

In certain aspects, after sending a second MIMO transmission with a second number of layers to a UE in response to a rank correction request, the BS may send one or more additional MIMO transmissions (e.g., a third MIMO transmission with a third number of layers) to the UE. The third number of layers may be different than the second number of layers. The UE combines samples from the third MIMO transmission with the first MIMO transmission and the second MIMO transmission to recover the data lost due to the decoding failure of the first MIMO transmission and/or the second MIMO transmission. The UE performs decoding of the combined samples of the first MIMO transmission, the second MIMO transmission, and third MIMO transmission. When the UE successfully decodes the combined samples of the first MIMO transmission, the second MIMO transmission, and the third MIMO transmission, the UE sends an ACK to the BS.

The techniques may be understood with reference to various non-limiting examples of rank adaptation.

First Non-Limiting Example

According to a first non-limiting example, a BS sends 4 layers in a rank 3 channel to a UE. For example, the BS initially sends a first MIMO transmission ($y_A$) to the UE. $y_A$ is equal to $\tilde{H}x+n=H[p_0\ p_1\ p_2\ p_3]x+n$ where $x=[x_0\ x_1\ x_2\ x_3]^T$. Here, $\tilde{H}$ corresponds to a channel, x corresponds to a vector value, n corresponds to a noise, and $p_0\ p_1\ p_2\ p_3$ corresponds to a precoding matrix (with 4 columns).

In this example case, as illustrated in FIG. 7, since $\tilde{H}$ represents a rank 3 channel and the BS is sending 4 layers in the first MIMO transmission to the UE, the UE is not able to decode all the layers in the first MIMO transmission (i.e., demodulation may fail or succeed for only some of these 4 layers). For example, a minimum mean square error (MMSE) based demodulation of these layers may fail.

The UE determines that the decoding failure of the first transmission is caused by a rank mismatch (i.e., there is a mismatch between a previously indicated rank and a rank supported by channel conditions experienced by the first MIMO transmission).

The UE sends a rank correction request (e.g., a requested rank or a difference between the previously indicated rank and the rank supported by the channel conditions experienced by the first MIMO transmission) to the BS, in response to the decoding failure of the first MIMO transmission. Additionally, the UE ranks the 4 layers of the first MIMO transmission based on their SNR, and then sends SNR rank information of the 4 layers (e.g., $SNR(x_0)>SNR(x_1)>SNR(x_2)>SNR(x_3)$) along with the rank correction request to the BS.

In response to the rank correction request, in a second MIMO transmission ($y_B$) (assuming that channel has not changed much and the rank is still 3), the BS is able to send 3 layers to the UE. Also, the BS executes actions to correct the mismatch that occurred in the first MIMO transmission. For instance, between the first and second MIMO transmissions (each with the rank equal to 3) to the UE, the BS can send data equivalent of 6 layers. Since the BS already sent 4 layers in the first MIMO transmission to the UE, the BS adds 2 new layers in the second MIMO transmission to the UE to utilize full transmission capacity.

Accordingly, in the second MIMO transmission ($y_B=\tilde{H}x+n=H[p_3\ p_2\ p_1\ p_0]*[x_2\ x_3\ x_4\ x_5]^T+n$), $x_2\ x_3$ layers that were sent in the first MIMO transmission are sent again in the second MIMO transmission, and $x_4\ x_5$ layers are the new layers included in the second MIMO transmission. Also, in the second MIMO transmission, $p_3\ p_2\ p_1\ p_0$ corresponds to a modified precoding matrix (that is different from the precoding matrix in the first MIMO transmission).

The UE combines (or aggregates) received samples from the first MIMO transmission and the second MIMO transmission to recover any data lost due to the decoding failure of the first MIMO transmission. A combination of the samples from the first MIMO transmission and the second MIMO transmission is represented as:

$$\begin{bmatrix} y_A \\ y_B \end{bmatrix} = \begin{bmatrix} H_A[p_{A0}\ p_{A1}\ p_{A2}\ p_{A3}\ 0\ 0] \\ H_B[0\ 0\ p_{B3}\ p_{B2}\ p_{B1}\ p_{B0}] \end{bmatrix} [x_0\ x_1\ x_2\ x_3\ x_4\ x_5]^T.$$

In this example case, subscript 'A' and 'B' signals the channel and precoding vectors used for the first MIMO transmission and the second MIMO transmission respectively. The precoding vectors for the first MIMO transmission and the second MIMO transmission are same when the channel for the first MIMO transmission and the second MIMO transmission has not changed over a period of time, otherwise the precoding vectors for the first MIMO transmission and the second MIMO transmission are similar.

In this example case, if precoding is optimal (i.e., p=v), then if eigenvalues of H are a vector D, then the eigenvalues of:

$$\begin{bmatrix} H_A[p_{A0} & p_{A1} & p_{A2} & p_{A3} & 0 & 0] \\ H_B[0 & 0 & p_{B3} & p_{B2} & p_{B1} & p_{B0}] \end{bmatrix}$$

are the same vector D. Since eigenvalue will have a multiplicity of 2, an expected optimal capacity is achieved. Also, the second MIMO transmission does not pay a power penalty that is paid in the first MIMO transmission.

In certain aspects, if precoding is not optimal, then performance of a scheme (for compensating for an overestimation of a rank indicator (RI) through space-time precoding) may adversely impact precoding quality.

Figure 8:
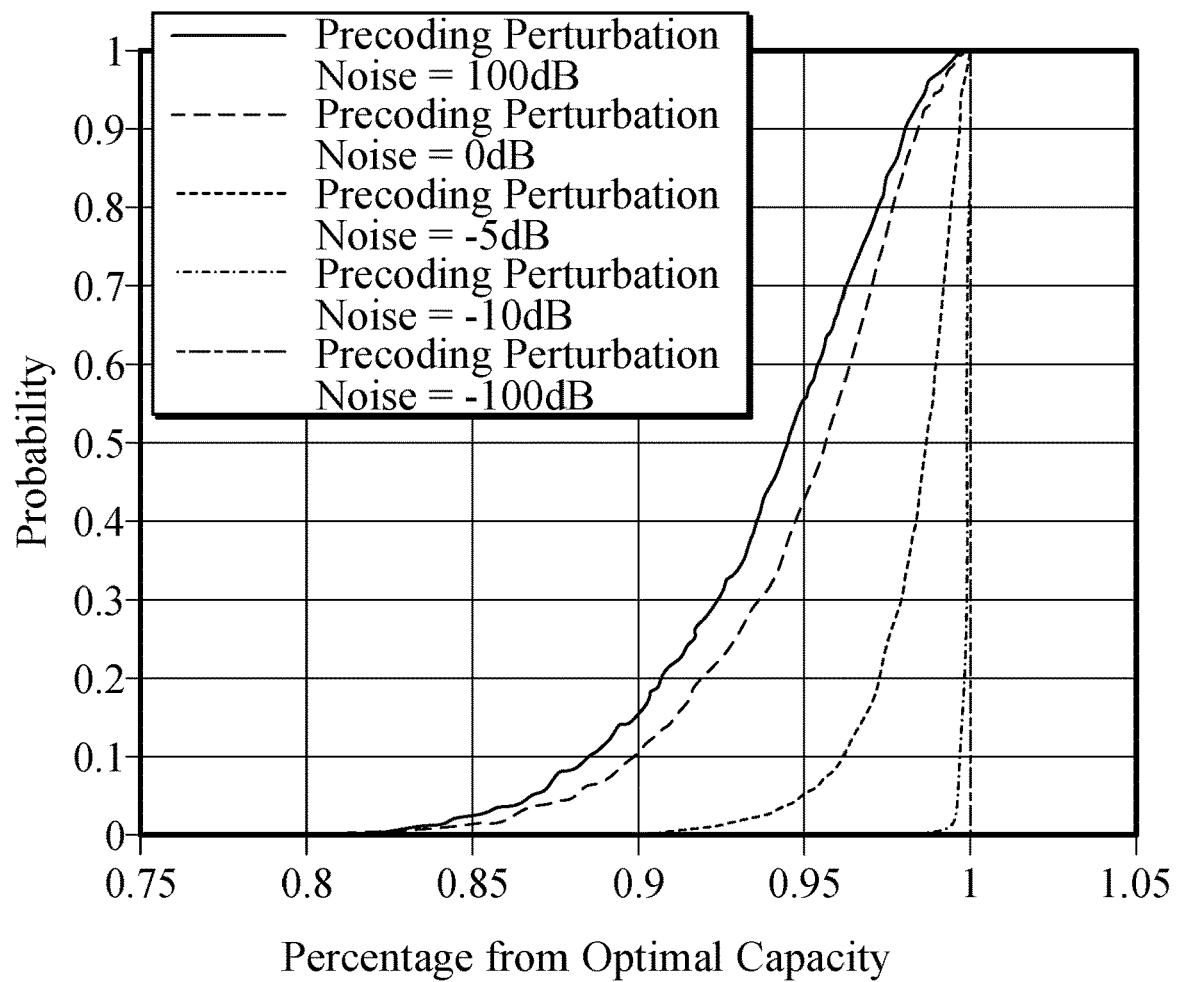
FIG. 8 depicts example cumulative distribution function (CDF) of an optimal capacity for various precoding distortions to illustrate a near optimality of a technique described herein.

In some cases, a rank 6 is preserved. As illustrated in FIG. 8, a cumulative distribution function (CDF) of an optimal capacity for various precoding distortions is shown. For example, the CDF of a proposed scheme mutual information (based on eigenvalues analysis) versus an optimal mutual information is shown. The optimal mutual information is based on two times MI achieved by an original matrix H.

In certain aspects, as illustrated in FIG. 8, when there is an optimal precoding, there is no performance loss. In certain aspects, the performance loss is dependent on a precoding non-optimality. To evaluate the precoding non-optimality, perturbation noise is added to a precoding matrix (and a unitary matrix is extracted from the precoding matrix by a quick response (QR) decomposition).

In certain aspects, for non-optimal precoding, a small performance loss (e.g., of up to ~6% in 50% of cases) happens when the precoding matrix is completely random (and perturbation noise is 100 dB). In certain aspects, when there is a smaller perturbation noise, a performance quickly converges to an optimal performance.

Second Non-Limiting Example

According to a second non-limiting example, a BS sends 4 layers in a rank 2 channel. For example, the BS initially sends a first MIMO transmission ($y_A$) to the UE. As noted in example above, $y_A$ is equal to $\tilde{H}x+n=H[p_0 \ p_1 \ p_2 \ p_3]x+n$ where $x=[x_0 \ x_1 \ x_2 \ x_3]^T$.

In this example case, as illustrated in FIG. 7, since $\tilde{H}$ represents a rank 2 channel and the BS is sending 4 layers in the first MIMO transmission to the UE, the UE is not able to decode all the layers in the first MIMO transmission. When the UE determines that a decoding failure of the first MIMO transmission is caused by a rank mismatch, the UE sends a rank correction request to the BS.

In response to the rank correction request, in a second MIMO transmission ($y_B$) (assuming that channel has not changed much and the rank is still 2), the BS is able to send 2 layers to the UE. Also, the BS executes actions to correct the mismatch that occurred in the first MIMO transmission. For instance, between the first and second MIMO transmissions (each with the rank equal to 2) to the UE, the BS can send data equivalent of 4 layers. Since the BS already sent 4 layers in the first MIMO transmission to the UE, the BS does not add any new layers in the second MIMO transmission to the UE.

Accordingly, in the second MIMO transmission ($y_B=\tilde{H}x+n=H[p_1 \ p_0]*[x_3 \ x_2]^T+n$), $x_3 \ x_2$ layers that were sent in the first MIMO transmission are sent again in the second MIMO transmission and no new layers are included in this second MIMO transmission.

The UE combines (or aggregates) received samples from the first MIMO transmission and the second MIMO transmission to recover any data lost due to the decoding failure of the first MIMO transmission. A combination of the samples from the first MIMO transmission and the second MIMO transmission is represented as:

$$\begin{bmatrix} y_A \\ y_B \end{bmatrix} = \begin{bmatrix} H_A[p_{A0} & p_{A1} & p_{A2} & p_{A3}] \\ H_B[0 & 0 & p_{B1} & p_{B0}] \end{bmatrix} [x_0 \ x_1 \ x_2 \ x_3]^T.$$

Example MCS Adaptation

Figure 9:
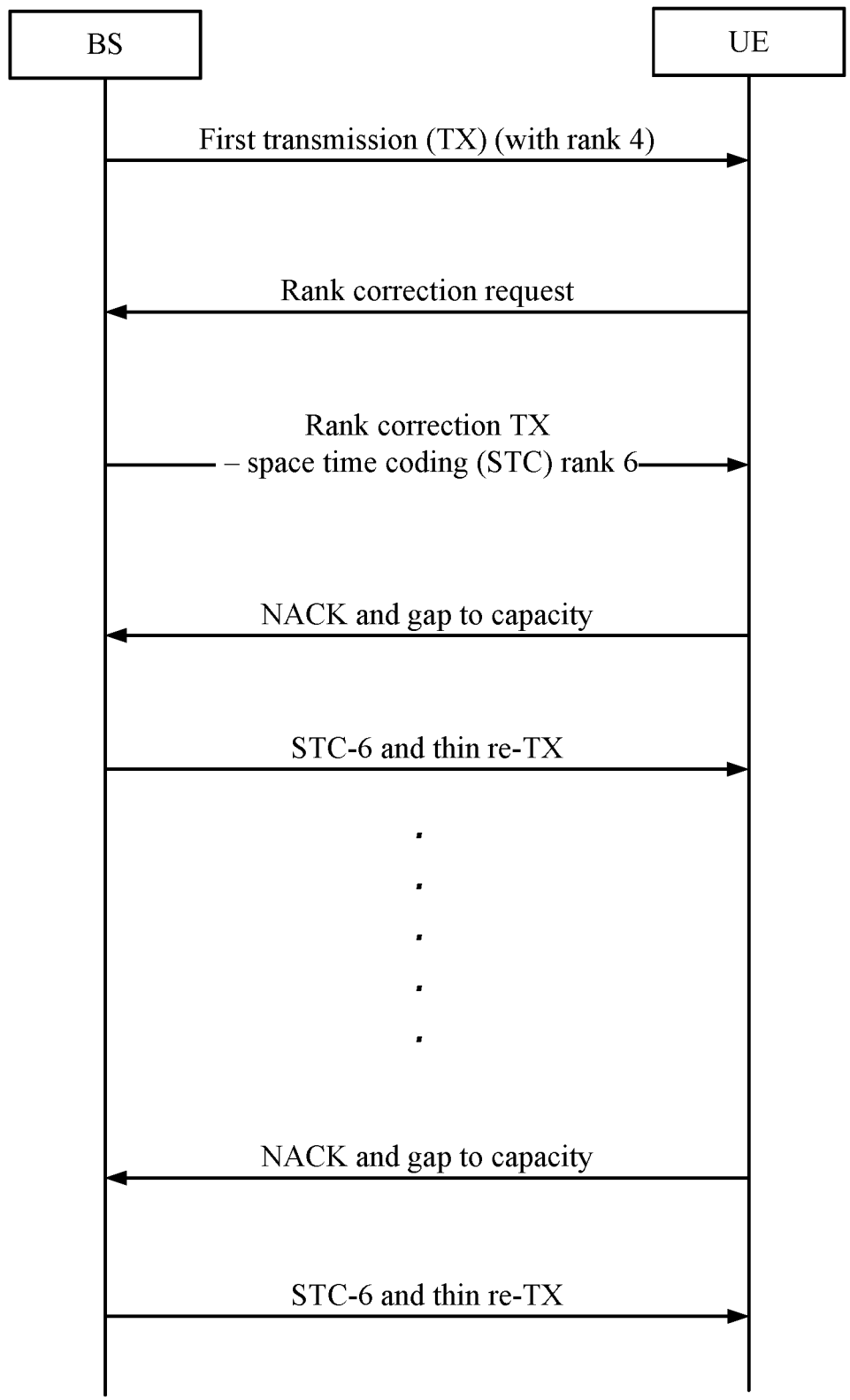
FIG. 9 depicts a call flow diagram illustrating example signaling for decoding MIMO transmission and retransmissions.

As illustrated in FIG. 9, in some cases, a BS may send a first MIMO transmission on a first number of layers to a UE. The UE sends a rank correction request to the BS, in response to detecting a decoding failure of the first MIMO transmission due to a rank mismatch. The BS sends a second MIMO transmission (e.g., a rank correction transmission) with a second number of layers to the UE, in response to the rank correction request.

The UE may send a negative acknowledgment (NACK) (and a gap to capacity) to the BS, in response to the decoding failure of combined samples from the first MIMO transmission and the second MIMO transmission. In certain aspects, even when the combining of the samples from the first MIMO transmission and the second MIMO transmission have recovered data lost due to the decoding failure of the first MIMO transmission, the decoding failure may occur due to a high/inappropriate coding rate. In certain aspects, the UE participates in a coding rate adaptation (e.g., a modulation and coding scheme (MCS) adaption) using a multiple incremental redundancy scheme (MIRS) and a space-time code (STC).

The BS may sends (thin) retransmissions of the first MIMO transmission and the second MIMO transmission, in response to the NACK. In one example, the BS resends layers with precoding matrices related to both the first MIMO transmission and the second MIMO transmission by using odd retransmission(s) for the first MIMO transmission and even retransmission(s) for the second MIMO transmission. In another example, the BS resends the layers with the precoding matrices related to both the first MIMO transmission and the second MIMO transmission by using even retransmission(s) for the first MIMO transmission and odd retransmission(s) for the second MIMO transmission. In another example, the BS may use any other multiplexing technique to resend the layers with precoding matrices related to both the first MIMO transmission and the second MIMO transmission to the UE.

In some cases, the UE may aggregate even and odd retransmissions of the first MIMO transmission and the second MIMO transmission to form precoding matrices and then demodulate per layer. In one example case (as illustrated in FIG. 7 where a rank adaption sequence is 4 to 3), an aggregate of the samples from even and odd retransmissions of the first MIMO transmission and the second MIMO transmission is represented as:

$$\begin{bmatrix} y_A \\ y_B \end{bmatrix} = \begin{bmatrix} H_A[p_{A0} & p_{A1} & p_{A2} & p_{A3} & 0 & 0] \\ H_B[0 & 0 & p_{B3} & p_{B2} & p_{B1} & p_{B0}] \end{bmatrix} [x_0 \ x_1 \ x_2 \ x_3 \ x_4 \ x_5]^T$$

In this example case, the UE receives the first MIMO transmission ($y_A$) in even retransmissions and the second MIMO transmission ($y_B$) in odd retransmissions from the BS. In certain aspects, an original matrix H is used where in even subcarriers first three layers are transmitted and in odd subcarriers next three layers are transmitted.

Example Wireless Communication Devices

Figure 10:
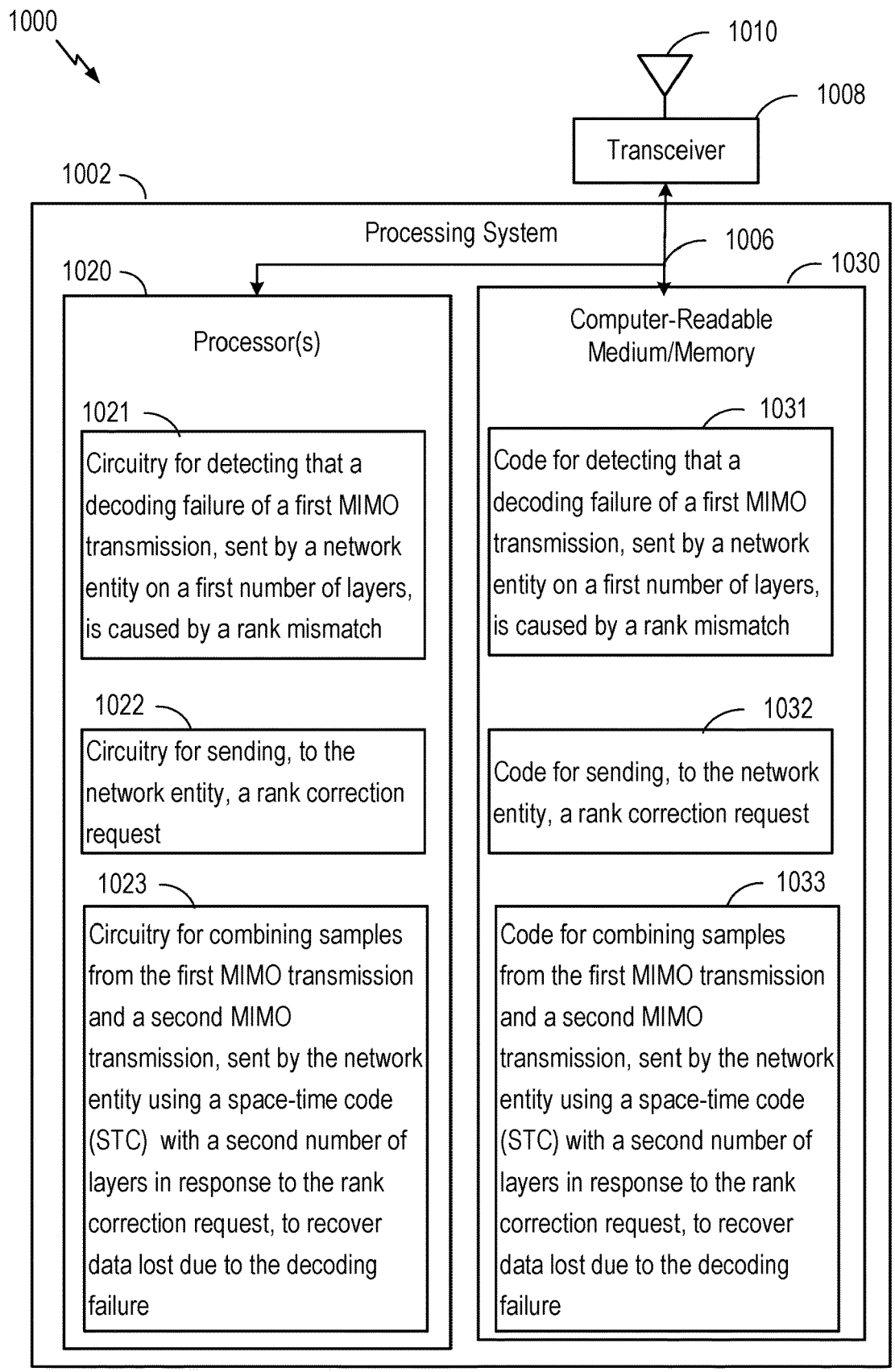
FIG. 10 depicts aspects of an example communications device.

FIG. 10 depicts an example communications device 1000 that includes various components operable, configured, or adapted to perform operations for the techniques disclosed herein, such as the operations depicted and described with respect to FIG. 4. In some examples, communication device 1000 may be a user equipment (UE) 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1020 via a bus 1006. In certain aspects, computer-readable medium/memory 1020 is configured to store instructions (e.g., computer-executable code) that when executed by the one or more processors 1020, cause the one or more processors 1020 to perform the operations illustrated in FIG. 4, or other operations for performing the various techniques discussed herein.

In the depicted example, computer-readable medium/memory 1030 stores code 1031 for detecting that a decoding failure of a first multiple input multiple output (MIMO) transmission sent by a network entity on a first number of layers is caused by a rank mismatch, code 1032 for sending to the network entity a rank correction request, and code 1033 for combining samples from the first MIMO transmission and a second MIMO transmission sent by the network entity using a space-time code (STC) with a second number of layers in response to the rank correction request to recover data lost due to the decoding failure.

In the depicted example, the one or more processors 1020 include circuitry configured to implement the code stored in the computer-readable medium/memory 1030, including circuitry 1021 for detecting that a decoding failure of a first MIMO transmission sent by a network entity on a first number of layers is caused by a rank mismatch, circuitry 1022 for sending to the network entity a rank correction request, and circuitry 1023 for combining samples from the first MIMO transmission and a second MIMO transmission sent by the network entity using a STC with a second number of layers in response to the rank correction request to recover data lost due to the decoding failure.

Various components of communications device 1000 may provide means for performing the methods described herein, including with respect to FIG. 4.

In some examples, means for transmitting or sending (or means for outputting for transmission) may include the transceivers 254 and/or antenna(s) 252 of the UE 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the UE 104 illustrated in FIG. 2 and/or transceiver 1008 and antenna 1010 of the communication device 1000 in FIG. 10.

In some examples, means for detecting that a decoding failure of a first MIMO transmission sent by a network entity on a first number of layers is caused by a rank mismatch, means for sending to the network entity a rank correction request, and means for combining samples from the first MIMO transmission and a second MIMO transmission sent by the network entity using a STC with a second number of layers in response to the rank correction request to recover data lost due to the decoding failure may include various processing system components, such as: the one or more processors 1020 in FIG. 10, or aspects of the UE 104 depicted in FIG. 2, including receive processor 258, transmit processor 264, TX MIMO processor 266, and/or controller/processor 280 (including MIMO component 281).

Notably, FIG. 10 is just use example, and many other examples and configurations of communication device 1000 are possible.

Figure 11:
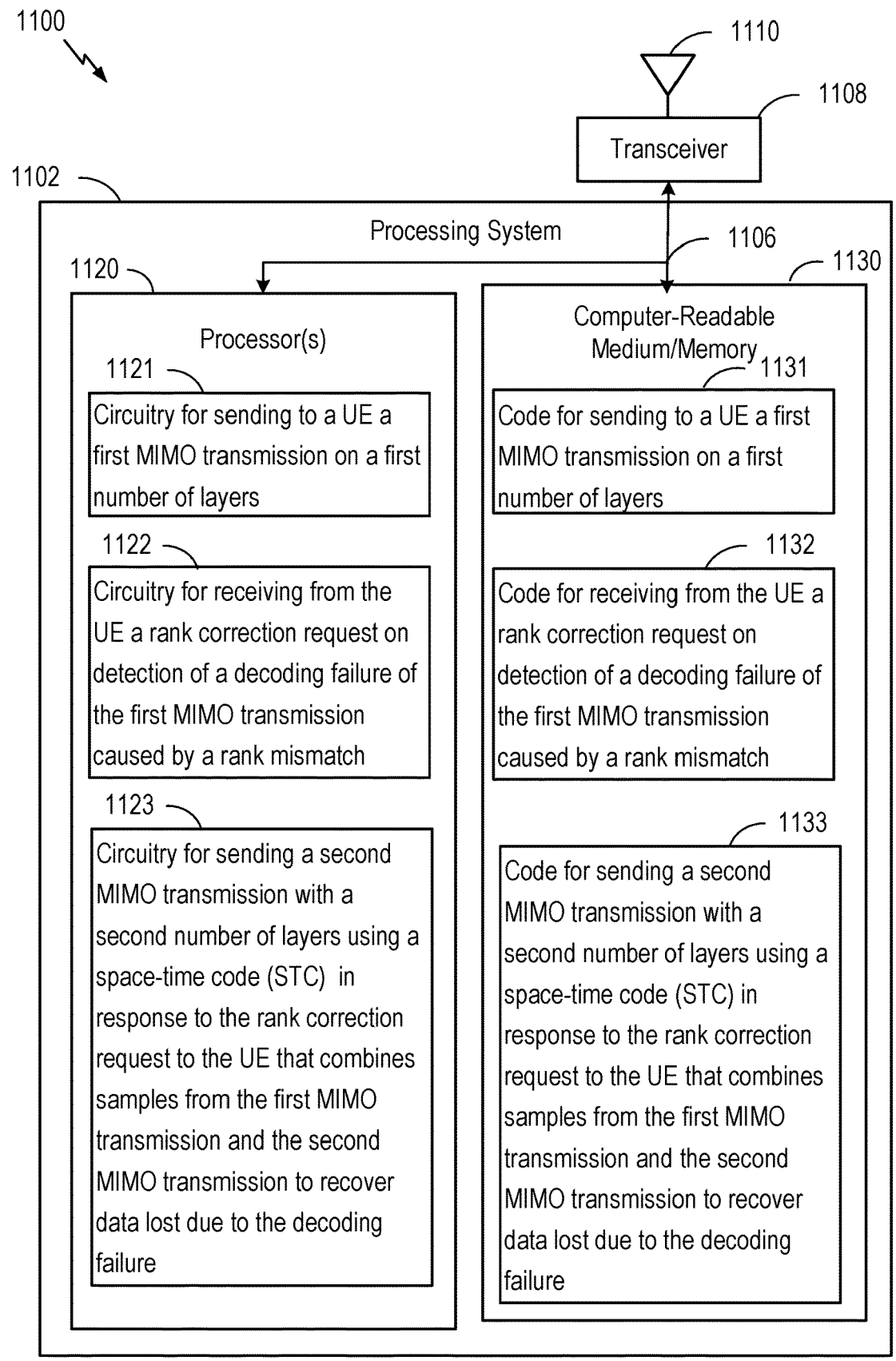
FIG. 11 depicts aspects of an example communications device.

FIG. 11 depicts an example communications device 1100 that includes various components operable, configured, or adapted to perform operations for the techniques disclosed herein, such as the operations depicted and described with respect to FIG. 5. In some examples, communication device 1100 may be a base station (BS) 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1120 via a bus 1106. In certain aspects, computer-readable medium/memory 1120 is configured to store instructions (e.g., computer-executable code) that when executed by the one or more processors 1120, cause the one or more processors 1120 to perform the operations illustrated in FIG. 5, or other operations for performing the various techniques discussed herein.

In the depicted example, computer-readable medium/memory 1130 stores code 1131 for sending to a UE a first MIMO transmission on a first number of layers, code 1132 for receiving from the UE a rank correction request on detection of a decoding failure of the first MIMO transmission caused by a rank mismatch, and code 1133 for sending a second MIMO transmission with a second number of layers using a STC in response to the rank correction request to the UE that combines samples from the first MIMO transmission and the second MIMO transmission to recover data lost due to the decoding failure.

In the depicted example, the one or more processors 1120 include circuitry configured to implement the code stored in the computer-readable medium/memory 1130, including circuitry 1121 for sending to a UE a first MIMO transmission on a first number of layers, circuitry 1122 for receiving from the UE a rank correction request on detection of a decoding failure of the first MIMO transmission caused by a rank mismatch, and circuitry 1123 for sending a second MIMO transmission with a second number of layers using a STC in response to the rank correction request to the UE that combines samples from the first MIMO transmission and the second MIMO transmission to recover data lost due to the decoding failure.

Various components of communications device 1100 may provide means for performing the methods described herein, including with respect to FIG. 5.

In some examples, means for transmitting or sending (or means for outputting for transmission) may include the transceivers 232 and/or antenna(s) 234 of the BS 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the BS 102 illustrated in FIG. 2 and/or transceiver 1108 and antenna 1110 of the communication device 1100 in FIG. 11.

In some examples, means for sending to a UE a first MIMO transmission on a first number of layers, means for receiving from the UE a rank correction request on detection of a decoding failure of the first MIMO transmission caused by a rank mismatch, and means for sending a second MIMO transmission with a second number of layers using a STC in response to the rank correction request to the UE that combines samples from the first MIMO transmission and the second MIMO transmission to recover data lost due to the decoding failure may include various processing system components, such as: the one or more processors 1120 in FIG. 11, or aspects of the BS 102 depicted in FIG. 2, including receive processor 238, transmit processor 220, TX MIMO processor 230, and/or controller/processor 240 (including MIMO component 241) and the rule may include various processing system components, such as: the one or more processors 1120 in FIG. 11, or aspects of the BS 102 depicted in FIG. 2, including receive processor 258, transmit processor 264, TX MIMO processor 266, and/or controller/processor 280 (including MIMO component 281).

Notably, FIG. 11 is just use example, and many other examples and configurations of communication device 1100 are possible.

Example Clauses

Implementation examples are described in the following numbered clauses:

Clause 1: A method for wireless communications by a user equipment (UE), comprising: detecting that a decoding failure of a first multiple input multiple output (MIMO) transmission, sent by a network entity on a first number of layers, is caused by a rank mismatch; sending, to the network entity, a rank correction request; and combining samples from the first MIMO transmission and a second MIMO transmission, sent by the network entity using a space-time code (STC) with a second number of layers in response to the rank correction request, to recover data lost due to the decoding failure.

Clause 2: The method alone or in combination with the first clause, wherein the rank mismatch indicates a mismatch between a previously indicated rank and a rank supported by channel conditions experienced by the first MIMO transmission.

Clause 3: The method alone or in combination with one or more of the first and second clauses, further comprising ranking the first number of layers based on a signal to noise ratio (SNR); and including information regarding the ranking with the rank correction request.

Clause 4: The method alone or in combination with one or more of the first through third clauses, wherein the rank correction request is sent via at least one of: a physical uplink control channel (PUCCH) or a physical uplink shared channel (PUSCH), and indicates at least one of: a requested rank or a difference in rank.

Clause 5: The method alone or in combination with one or more of the first through fourth clauses, further comprising: receiving, from the network entity, a demodulation reference signal (DMRS); and determining the requested rank based on the DMRS.

Clause 6: The method alone or in combination with one or more of the first through fifth clauses, wherein the difference in rank indicates a value corresponding to a difference between a previously indicated rank and a rank supported by channel conditions experienced by the first MIMO transmission.

Clause 7: The method alone or in combination with one or more of the first through sixth clauses, wherein the second MIMO transmission conveys data equivalent of the second number of layers, and wherein the second number of layers comprises at least one of: a number of new layers, the first number of layers, or a subset of the first number of layers.

Clause 8: The method alone or in combination with one or more of the first through seventh clauses, wherein layers within the subset of the first number of layers are selected based on their associated signal to noise ratio (SNR).

Clause 9: The method alone or in combination with one or more of the first through eighth clauses, wherein: the first MIMO transmission has a precoding matrix associated with the first number of layers; and the second MIMO transmission has a modified precoding matrix for the second number of layers.

Clause 10: The method alone or in combination with one or more of the first through ninth clauses, wherein same precoding vectors but with a different order are used for the first MIMO transmission and the second MIMO transmission when channel conditions are same or similar between the first MIMO transmission and the second MIMO transmission.

Clause 11: The method alone or in combination with one or more of the first through tenth clauses, further comprising combining samples from a third MIMO transmission with the first MIMO transmission and the second MIMO transmission to recover the data lost due to the decoding failure.

Clause 12: The method alone or in combination with one or more of the first through eleventh clauses, wherein the third MIMO transmission is sent with a third number of layers different than the second number of layers.

Clause 13: The method alone or in combination with one or more of the first through twelfth clauses, further comprising: participating in coding rate adaptation after sending the rank correction request.

Clause 14: The method alone or in combination with one or more of the first through thirteenth clauses, further comprising: receiving one or more retransmissions of the first MIMO transmission and the second MIMO transmission at least in response to the decoding failure of the second MIMO transmission.

Clause 15: A method for wireless communications by a network entity, comprising: sending, to a user equipment (UE), a first multiple input multiple output (MIMO) transmission on a first number of layers; receiving, from the UE, a rank correction request on detection of a decoding failure of the first MIMO transmission caused by a rank mismatch; and sending a second MIMO transmission with a second number of layers, using a space-time code (STC), in response to the rank correction request, to the UE that combines samples from the first MIMO transmission and the second MIMO transmission to recover data lost due to the decoding failure.

Clause 16: The method alone or in combination with the fifteenth clause, wherein the rank mismatch indicates a mismatch between a previously indicated rank and a rank supported by channel conditions experienced by the first MIMO transmission.

Clause 17: The method alone or in combination with one or more of the fifteenth and sixteenth clauses, wherein the rank correction request includes information regarding a ranking of the first number of layers based on a signal to noise ratio (SNR).

Clause 18: The method alone or in combination with one or more of the fifteenth through seventeenth clauses, wherein the rank correction request is received via at least one of: a physical uplink control channel (PUCCH) or a physical uplink shared channel (PUSCH), and indicates at least one of: a requested rank or a difference in rank.

Clause 13: The method alone or in combination with one or more of the fifteenth through eighteenth clauses, further comprising: sending, to the UE, a demodulation reference signal (DMRS) that is used by the UE to determine the requested rank.

Clause 20: The method alone or in combination with one or more of the fifteenth through nineteenth clauses, wherein the difference in rank indicates a value corresponding to a difference between a previously indicated rank and a rank supported by channel conditions experienced by the first MIMO transmission.

Clause 21: The method alone or in combination with one or more of the fifteenth through twentieth clauses, wherein: the second MIMO transmission conveys data equivalent of the second number of layers, and wherein the second number of layers comprises at least one of: a number of new layers, the first number of layers, or a subset of the first number of layers; layers within the subset of the first number of layers are selected based on their associated signal to noise ratio (SNR); and the first MIMO transmission has a precoding matrix associated with the first number of layers and the second MIMO transmission has a modified precoding matrix for the second number of layers.

Clause 22: The method alone or in combination with one or more of the fifteenth through twenty-first clauses, wherein same precoding vectors but with a different order are used for the first MIMO transmission and the second MIMO transmission when channel conditions are same or similar between the first MIMO transmission and the second MIMO transmission.

Clause 23: The method alone or in combination with one or more of the fifteenth through twenty-second clauses, wherein samples from a third MIMO transmission are combined by the UE with the first MIMO transmission and the second MIMO transmission to recover the data lost due to the decoding failure.

Clause 24: The method alone or in combination with one or more of the fifteenth through twenty-third clauses, wherein the third MIMO transmission is sent with a third number of layers different than the second number of layers.

Clause 25: The method alone or in combination with one or more of the fifteenth through twenty-fourth clauses, wherein the UE participates in coding rate adaptation after sending the rank correction request.

Clause 26: The method alone or in combination with one or more of the fifteenth through twenty-fifth clauses, further comprising: sending one or more retransmissions of the first MIMO transmission and the second MIMO transmission at least in response to the decoding failure of the second MIMO transmission.

Clause 27: An apparatus, comprising: a memory comprising executable instructions; one or more processors configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and base station (BS) 102, next generation NodeB (gNB or gNodeB), access point (AP), distributed unit (DU), carrier, or transmission reception point may be used interchangeably. A BS 102 may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) 104 with service subscription. A pico cell may cover a relatively small geographic area (e.g., a sports stadium) and may allow unrestricted access by UEs 104 with service subscription. A femto cell may cover a relatively small geographic area (e.g., a home) and may allow restricted access by UEs 104 having an association with the femto cell (e.g., UEs in a Closed Subscriber Group (CSG) and UEs 104 for users in the home). A BS 102 for a macro cell may be referred to as a macro BS. A BS 102 for a pico cell may be referred to as a pico BS. A BS 102 for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 130 through second backhaul links 184. BSs 102 may communicate directly or indirectly (e.g., through the EPC 160 or 5GC 130) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs 102, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 130 may include an Access and Mobility Management Function (AMF) 132, other AMFs 133, a Session Management Function (SMF) 134, and a User Plane Function (UPF) 135. AMF 132 may be in communication with a Unified Data Management (UDM) 136.

AMF 132 is generally the control node that processes the signaling between UEs 104 and 5GC 130. Generally, AMF 132 provides QoS flow and session management.

All user Internet protocol (IP) packets are transferred through UPF 135, which is connected to the IP Services 137, and which provides UE IP address allocation as well as other functions for 5GC 130. IP Services 137 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for repeated initial transmission of an uplink random access channel (RACH) message (e.g., msg3 message) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a user equipment (UE), comprising:
a memory comprising instructions; and
one or more processors configured to execute the instructions and cause the UE to:
detect that a decoding failure of a first multiple input multiple output (MIMO) transmission received on a first number of layers is caused by a rank mismatch, wherein the rank mismatch indicates that the first number of layers is different than a rank number of a current channel;
send, to a network entity, a rank correction request;
combine samples from the first MIMO transmission and a second MIMO transmission received on a second number of layers in response to the rank correction request, to recover data lost due to the decoding failure, wherein the second number of layers comprises a subset of the first number of layers selected based on their associated signal to noise ratio (SNR);
rank the first number of layers based on their associated SNR; and
include information regarding the ranking with the rank correction request.

2. The apparatus of claim 1, wherein the rank mismatch indicates a mismatch between a previously indicated rank number and a rank number supported by channel conditions experienced by the first MIMO transmission.

3. The apparatus of claim 1, wherein the one or more processors are configured to execute the instructions and cause the UE to send the rank correction request via at least one of: a physical uplink control channel (PUCCH) or a physical uplink shared channel (PUSCH), and wherein the rank correction indicates at least one of: a requested rank number or a difference in rank numbers.

4. The apparatus of claim 3, the one or more processors are configured to execute the instructions and cause the UE to:
receive, from the network entity, a demodulation reference signal (DMRS); and
determine the requested rank number based on the DMRS.

5. The apparatus of claim 3, wherein the difference in rank numbers indicates a value corresponding to a difference between a previously indicated rank number and a rank number supported by channel conditions experienced by the first MIMO transmission.

6. The apparatus of claim 1, wherein the second MIMO transmission conveys data equivalent of the second number of layers, and wherein the second number of layers comprises at least one of: a number of new layers or the first number of layers.

7. The apparatus of claim 1, wherein layers within the subset of the first number of layers have lowest SNRs among the first number of layers.

8. The apparatus of claim 6, wherein:
the first MIMO transmission has a precoding matrix associated with the first number of layers; and
the second MIMO transmission has a modified precoding matrix associated with the second number of layers.

9. The apparatus of claim 1, wherein the first and the second MIMO transmissions respectively have different first and second orders of precoding vectors, when channel conditions are same or similar between the first and the second MIMO transmissions.

10. The apparatus of claim 1, the one or more processors are configured to execute the instructions and cause the UE to combine samples from a third MIMO transmission with the first MIMO transmission and the second MIMO transmission to recover the data lost due to the decoding failure.

11. The apparatus of claim 10, wherein the one or more processors are configured to execute the instructions and cause the UE to receive the third MIMO transmission with a third number of layers different than the second number of layers.

12. The apparatus of claim 1, the one or more processors are configured to execute the instructions and cause the UE to:
participate in coding rate adaptation after sending the rank correction request.

13. The apparatus of claim 1, the one or more processors are configured to execute the instructions and cause the UE to:
receive one or more retransmissions of the first MIMO transmission and the second MIMO transmission at least in response to the decoding failure of the second MIMO transmission.

14. An apparatus for wireless communications by a network entity, comprising:
a memory comprising instructions; and
one or more processors configured to execute the instructions and cause the UE to:
send, to a user equipment (UE), a first multiple input multiple output (MIMO) transmission on a first number of layers;
receive, from the UE, a rank correction request indicating a decoding failure of the first MIMO transmission caused by a rank mismatch, wherein the rank mismatch indicates that the first number of layers is different than a rank number of a current channel; and
send a second MIMO transmission with a second number of layers, using a space-time code (STC), in response to the rank correction request, to the UE to recover data lost due to the decoding failure, wherein the second number of layers comprises a subset of the first number of layers selected based on their associated signal to noise ratio (SNR),
wherein the rank correction request includes information regarding a ranking of the first number of layers based on their associated SNR.

15. The apparatus of claim 14, wherein the rank mismatch indicates a mismatch between a previously indicated rank number and a rank number supported by channel conditions experienced by the first MIMO transmission.

16. The apparatus of claim 14, wherein the one or more processors are configured to execute the instructions and cause the UE to receive the rank correction request via at least one of: a physical uplink control channel (PUCCH) or a physical uplink shared channel (PUSCH), and wherein the rank correction indicates at least one of: a requested rank number or a difference in rank numbers.

17. The apparatus of claim 16, wherein the one or more processors are configured to execute the instructions and cause the UE to:
send, to the UE, a demodulation reference signal (DMRS) for use in determination of the requested rank number.

18. The apparatus of claim 16, wherein the difference in rank numbers indicates a value corresponding to a difference between a previously indicated rank number and a rank number supported by channel conditions experienced by the first MIMO transmission.

19. The apparatus of claim 14, wherein:
the second MIMO transmission conveys data equivalent of the second number of layers, and wherein the second number of layers comprises at least one of: a number of new layers or the first number of layers;
layers within the subset of the first number of layers have lowest SNRs among the first number of layers; and
the first MIMO transmission has a precoding matrix associated with the first number of layers and the second MIMO transmission has a modified precoding matrix associated with the second number of layers.

20. The apparatus of claim 14, wherein the first and the second MIMO transmissions respectively have different first and second orders of precoding vectors, when channel conditions are same or similar between the first and the second MIMO transmissions.

21. The apparatus of claim 14, wherein samples from a third MIMO transmission are a combination of the first MIMO transmission and the second MIMO transmission.

22. The apparatus of claim 21, wherein the third MIMO transmission has a third number of layers different than the second number of layers.

23. The apparatus of claim 14, the one or more processors are configured to execute the instructions and cause the UE to:
send one or more retransmissions of the first MIMO transmission and the second MIMO transmission at least in response to the decoding failure of the second MIMO transmission.

24. A method for wireless communications by a user equipment (UE), comprising:
detecting that a decoding failure of a first multiple input multiple output (MIMO) transmission received on a first number of layers is caused by a rank mismatch, wherein the rank mismatch indicates that the first number of layers is different than a rank number of a current channel;
sending, to a network entity, a rank correction request;
combining samples from the first MIMO transmission and a second MIMO transmission received on a second number of layers in response to the rank correction request, to recover data lost due to the decoding failure, wherein the second number of layers comprises a subset of the first number of layers selected based on their associated signal to noise ratio (SNR);
ranking the first number of layers based on their associated SNR; and
including information regarding the ranking with the rank correction request.

25. The method of claim 24, wherein the rank mismatch indicates a mismatch between a previously indicated rank number and a rank number supported by channel conditions experienced by the first MIMO transmission.

26. The method of claim 24, wherein the rank correction request is sent via at least one of: a physical uplink control channel (PUCCH) or a physical uplink shared channel (PUSCH), and wherein the rank correction indicates at least one of: a requested rank number or a difference in rank numbers.

27. The method of claim 24, wherein the second MIMO transmission conveys data equivalent of the second number of layers, and wherein the second number of layers comprises at least one of: a number of new layers or the first number of layers.

28. The method of claim 24, further comprising combining samples from a third MIMO transmission with the first MIMO transmission and the second MIMO transmission to recover the data lost due to the decoding failure.

29. A method for wireless communications by a network entity, comprising:
sending, to a user equipment (UE), a first multiple input multiple output (MIMO) transmission on a first number of layers;
receiving, from the UE, a rank correction request indicating a decoding failure of the first MIMO transmission due to a rank mismatch, wherein the rank mismatch indicates that the first number of layers is different than a rank number of a current channel; and
sending a second MIMO transmission with a second number of layers, using a space-time code (STC), in response to the rank correction request, to the UE to recover data lost due to the decoding failure, wherein the second number of layers comprises a subset of the first number of layers selected based on their associated signal to noise ratio (SNR),
wherein the rank correction request includes information regarding a ranking of the first number of layers based on their associated SNR.

30. The method of claim 29, wherein the rank mismatch indicates a mismatch between a previously indicated rank number and a rank number supported by channel conditions experienced by the first MIMO transmission.

* * * * *